United States Patent Office 2,883,312
Patented Apr. 21, 1959

2,883,312

REMOVAL OF FLASH FROM CERAMIC PARTS FORMED BY PRESSING

Flemmon P. Hall, Syracuse, N.Y., assignor to Pass & Seymour, Inc., Syracuse, N.Y., a corporation of New York No Drawing. Application June 4, 1958
Serial No. 739,653

14 Claims. (Cl. 134—32)

This application relates to the production of ceramic parts formed by pressing and more particularly to the process for removing flash from unfired ceramic parts formed by pressing.

This application is a continuation-in-part of my original application Serial No. 518,668, filed June 28, 1955, for "Flash Removal from Dry Pressed Porcelain Parts."

It is a general object of the present invention to provide a novel and improved process for the removal of flash from unfired ceramic parts formed by pressing.

This invention pertains to a simplified method for the removal of flash from unfired parts made from such potentially ceramic bodies which when properly fired produce porcelain, electronic ceramics, white ware, cermets, refractories, earthenware, structural tile, etc.

Ceramic parts are produced in several well known ways. One of the better known includes the forming of the mixed raw materials for the parts in a die and under pressure. This method is used in making small insulators and other ceramic parts. In this method a basic clay mixture of suitable ingredients is introduced into an open mold made of metal or other material in a quantity adequate to produce the part in question. A cover or die element is placed on the mold and forced under the required pressure in a press to its final position during which time it compresses the mixture causing it to cohere and produce unfired or "green" ceramic molded parts of sufficient strength to be handled carefully during the succeeding operations in its conversion to a fired ceramic part.

The mold is made in two or more parts dependent upon the form of the finished product and there are small clearances between the parts to permit the escape of air and the excess clay material during the compressing operation. These clearances and the excess material produce flash or fins which project from the various portions of the part adjacent junctions in the mold sections. These fins must be removed before the ceramic part is ready for use. They can be removed either from the unfired ceramic part, at which time their strength is minor, or from the fired ceramic part when they are extremely hard and brittle and must be ground or otherwise removed abrasively or by impact. In the unfired or "green" condition the fins can be removed with sandpaper, a knife or similar tool by laborious hand work and the surface at the base of the fins smoothed down by hand, or by the use of a wet brush or sponge. Either process is expensive, but it is more usual to remove the flash in the "green" or unfired state since the operation is simpler and less dangerous to the operator and sometimes simplifies the stacking of the parts preparatory to their being fired in a kiln.

It is an object of the present invention to provide a novel and improved non-manual method of removing the fins or flash from unfired ceramic parts formed by pressing.

More particularly, it is an object of the invention to provide a process of removing fins or flash from unfired ceramic parts, formed by pressing, by the use of a liquid capable of slaking the flash when relative movement occurs between that liquid and the unfired ceramic part.

An important object of the present invention consists in the treatment of the parts prior to the slaking by immersing in a hot colloid containing a small percentage of material capable of being coagulated on or near the surface of the unfired ceramic part and there acting as a barrier to slaking liquids.

A further object of the invention comprises the treatment of the unfired ceramic parts, having flash thereon, in a hot colloidal solution of a material capable of forming a barrier to liquid on or below the surface of the parts, in a liquid capable of slaking the parts and incapable of dissolving the first material, followed by relative agitation of the parts in a slaking liquid.

A further object of the invention consists in the production of de-fined, unfired ceramic parts formed by pressing, as well as de-finned fired ceramic parts therefrom.

Other and further objects and features of the invention will be more apparent to those skilled in the art upon a consideration of the following specification, wherein are disclosed several exemplary embodiments of the invention with the understanding that such changes may be made therein as fall within the scope of the appended claims without departing from the spirit of the invention.

As previously described, the unfired ceramic parts are molded by a well known process using steel or other material dies constructed so that as a result of the pressing operation, die flash or fins are unavoidably formed on the parts. This flash must be removed before the parts are fired in order to produce an economical product and one of good appearance.

In carrying out the process of the present invention, following the removal of the parts with flash thereon from the dies, they are appropriately positioned on a suitable ware board which is preferably perforated. In the event that the clay mixture from which the parts are formed has an appreciable percentage of moisture, it is generally desirable to reduce the content thereof by allowing the parts to dry in air or by forced drying in a dryer.

A simple tank or container sufficiently large to receive the ware board and the parts thereon is filled with a suitable colloid solution composed of a liquid capable of slaking or washing away the flash from the unfired ceramic parts, and a material capable of coagulating on or slightly below the surface of the unfired ceramic part and there forming a barrier to the said liquid. Many liquids and substances emulsifiable therein are available but preferable and simpler, the liquid is water and the barrier forming material a wax of the animal, mineral or vegetable type. Conveniently and cheaply paraffin wax is used in proportions of about 1 to 10% wax emulsion in 99 to 90% water. To insure and retain adequate emulsification, some suitable emulsifier, effective at the temperature of the liquid in the tank, is used in forming the emulsion before diluting.

The colloid solution is heated to and maintained at a temperature above the melting point of the wax selected, and the board of ware is immersed in the colloid and relative mechanical agitation between it and the unfired ceramic parts is effected in any desired manner until the fins are removed by a combination of slaking and mechanical agitation. When this is accomplished, the ware board is removed from the tank and the small amount of liquid allowed to evaporate from the parts. The wax is believed to solidify from the water on contacting the cool surface of the raw ceramic part to form a waterproof barrier to further penetration. The coagulated wax is just slightly below the surface of the part and thus protects it from further slaking in the solution.

In the event that the parts are to be glazed prior to firing, it is generally desirable, following the above immersion, to place the parts in a dryer at a temperature above the melting point of the wax. At this time the wax barrier which has formed on or slightly below the surface of the unfired ceramic part and thus prevented entrance of the liquid to weaken the molded articles, is melted and driven by the heat into the interior of the unfired part, so that the parts can then be glazed. The presence of the wax does not inhibit the adhesion of the glazing liquid.

It has been found that properly processed and formed unfired ceramic parts may be kept in the wax emulsion from 30 to 60 minutes without disintegration, whereas if the wax is not present the parts almost immediately slake when put in warm water and lose their shape and become worthless.

Parts dissected, after treatment as described but before the heating to remove the liquid and disperse the wax, indicate an almost impenetrable wax barrier on or just below the surface of the unfired part, but for some reason difficult to explain, this barrier is not formed in the thin flash or fins. The slight penetration of the liquid into the unfired parts seems to materially weaken the bond of the flash to the part so that the slight mechanical agitation resulting from either moving the ware board or stirring the liquid serves to remove the flash.

In a second embodiment of the method, the parts on the ware board are dipped into a colloid as described above, allowed to remain until the wax barrier forms and are then removed and immersed in a tank of unheated water where the relative mechanical movement by the liquid and the solid parts is effected and the slaking takes place. This to a large degree prevents fouling of the wax emulsion or colloid solution and practically all of the fins are slaked in the plain water which can be cheaply replaced or may even be in a running condition to renew itself, remove the slaked material and also provide the agitation.

The wax or waxes used in the process volatilized in the range of 400 to 650 degrees F. while the glaze is still open and hence there is no adverse effect during the firing operation of the ceramic parts. The glaze does not begin to sinter or harden until the temperature reaches 1500 to 1700 degrees F., well after all of the wax has evaporated from the parts. In many cases also the part is not glazed on all sides, thus leaving an area for the escape of wax vapors even should the glaze seal off some of the surface area before the wax is evaporated.

I claim:

1. The method of removing mold flash from unfired ceramic parts comprising the steps of immersing said parts in an emulsion of a wax-like material in a liquid capable of wetting the unfired ceramic part and producing relative motion between the parts and such liquid.

2. The method of removing mold flash from unfired, pressed, ceramic parts including the steps of preparing an emulsion of a wax-like material and introducing the parts into the emulsion, mechanically agitating the parts to slake the flash and removing the parts.

3. The method of removing mold flash from unfired, pressed, ceramic parts including the steps of preparing an emulsion of a wax-like material and introducing the parts into the emulsion, mechanically agitating the parts in a liquid capable of slaking the flash and then drying the parts.

4. The method of removing mold flash from unfired pressed ceramic parts including the steps of preparing an emulsion of a wax-like material at a temperature above the melting point of the material and introducing the parts into the emulsion, producing relative motion between the parts and a liquid capable of slaking the flash and then drying the parts.

5. The method of removing mold flash from unfired, pressed ceramic parts including the steps of preparing an emulsion with a wax-like material at a temperature above the melting point of the material and below the boiling point of the emulsion, introducing the parts into the emulsion, producing mechanical agitation between the parts and a liquid capable of slaking the flash and then drying the parts at a temperature above the melting point of the wax.

6. The method of removing mold flash from unfired ceramic parts comprising the steps of immersing said parts in a colloid composed of a liquid capable of slaking the material of the parts and a substance insoluble in said liquid and having a melting point below the boiling point of said liquid, said substance being capable of forming a barrier against said liquid on or below the surface of said parts at a colloid temperature between the melting point of said substance and the boiling point of the liquid, producing relative movement between the parts and the colloid until the flash is slaked away, and removing the parts.

7. The method of removing mold flash from unfired ceramic parts comprising the steps of immersing said parts in a colloid composed of a liquid and a substance insoluble therein and capable of forming a barrier adjacent the surface of the parts to a liquid capable of slaking the parts, maintaining said colloid at a temperature in the ascending range between the melting point of the substance, and the boiling point of the colloid, causing mechanical agitation between the parts and a liquid capable of slaking the material thereof until the flash is destroyed, removing and drying the parts.

8. The method of claim 7 in which the liquid in the colloid is water and the slaking of the flash of the parts is affected directly in the colloid.

9. The method of claim 7 in which the mechanical agitation is affected in a liquid other than the colloid and at a lower temperature.

10. The method of claim 1 in which the wax-like material is a wax selected from among the animal, vegetable and mineral waxes, having a melting point below the boiling point of water, being insoluble in water but emulsifiable therein.

11. The method of claim 5 in which the wax-like material is a wax selected from among the animal, vegetable and mineral waxes, having a melting point below the boiling point of water, being insoluble in water but emulsifiable therein.

12. The method of claim 11 in which the wax is paraffin and an emulsifier stable at the operating temperature is used.

13. The method of claim 12 in which the wax represents approximately one to ten percent of the colloid.

14. The method of removing mold flash from unfired ceramic parts comprising the steps of immersing said parts in a heated emulsion composed of water, paraffin and an emulsifier effective at the emulsion temperature of between the melting point of the wax and the boiling point of the emulsion, causing a mechanical agitation between the parts and water to slake and destroy the flash and removing the parts.

References Cited in the file of this patent

UNITED STATES PATENTS

| | | |
|---|---|---|
| 1,881,887 | Normann | Oct. 11, 1932 |
| 2,196,258 | Erdle | Apr. 9, 1940 |
| 2,209,624 | Jeffery | July 30, 1940 |
| 2,822,600 | Scott | Feb. 11, 1958 |